(12) United States Patent
Galindo-Legaria et al.

(10) Patent No.: US 7,162,472 B2
(45) Date of Patent: Jan. 9, 2007

(54) SYSTEM AND METHOD FOR DATABASE CHANGE NOTIFICATION

(75) Inventors: Cesar A. Galindo-Legaria, Redmond, WA (US); Goetz Graefe, Bellevue, WA (US); Christian Kleinerman, Bellevue, WA (US); Florian M. Waas, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 485 days.

(21) Appl. No.: 10/602,497

(22) Filed: Jun. 24, 2003

(65) Prior Publication Data

US 2004/0267741 A1    Dec. 30, 2004

(51) Int. Cl.
*G06F 7/00* (2006.01)
*G06F 17/30* (2006.01)

(52) U.S. Cl. .................. 707/4; 707/10; 707/201
(58) Field of Classification Search ............. 707/1–206; 709/201–253; 711/1–221
See application file for complete search history.

(56) References Cited

U.S. PATENT DOCUMENTS

| | | | | |
|---|---|---|---|---|
| 5,133,075 A | * | 7/1992 | Risch | 707/201 |
| 5,471,629 A | * | 11/1995 | Risch | 707/201 |
| 5,592,664 A | * | 1/1997 | Starkey | 707/1 |
| 5,826,253 A | * | 10/1998 | Bredenberg | 707/2 |
| 5,884,324 A | * | 3/1999 | Cheng et al. | 707/201 |
| 6,226,650 B1 | * | 5/2001 | Mahajan et al. | 707/201 |
| 6,321,236 B1 | * | 11/2001 | Zollinger et al. | 707/203 |
| 6,477,548 B1 | * | 11/2002 | Nihei | 707/204 |
| 6,523,032 B1 | * | 2/2003 | Sunkara et al. | 707/8 |
| 6,591,272 B1 | * | 7/2003 | Williams | 707/102 |
| 6,721,740 B1 | * | 4/2004 | Skinner et al. | 707/10 |
| 6,754,665 B1 | * | 6/2004 | Futagami et al. | 707/102 |
| 6,895,401 B1 | * | 5/2005 | Skinner et al. | 707/1 |
| 6,968,432 B1 | * | 11/2005 | Croisettier et al. | 711/147 |

OTHER PUBLICATIONS

Ling Liu et al., "Continual Queries for Internet Scale Event-Driven Information Delivery", IEEE Transactions on Knowledge and Data Engineering, vol. 11, No. 4, Jul./Aug. 1999.*
Cardellini, v. et al., "The State of the Art in Locally Distributed Web-Server Systems", *ACM Computing Surveys*, 2002, 34(2), 263-311.
Gopalan, P. et al., "Caching with Expiration Times", pp. 540-547.
Padmanabhan, V. N. et al., "The Content and Access Dynamics of a Busy Web Site: Findings and Implications", *SIGCOMM*, 2000, 111-123.
Yin, J. et al., "Engineering Web Cache Consistency", *ACM Transactions on Internet Technology*, 2002, 2(3), 224-259.
Yu, H. et al., "A Scalable Web Cache Consistency Architecture", *SIGCOMM*, 1999, 163-174.

* cited by examiner

*Primary Examiner*—Tim Vo
*Assistant Examiner*—Jay Allen Morrison
(74) *Attorney, Agent, or Firm*—Woodcock Washburn LLP

(57) ABSTRACT

A client submits a subscription to a database specifying selected data within a data set. A subscription plan is generated based on the subscription. A query is submitted to the database changing selected data within the data set. A query plan is generated based on the query. The subscription is matched to the query based on the data set, and the query plan is supplemented with the subscription plan to generate a notification of the change to the client.

18 Claims, 11 Drawing Sheets

(Prior Art)

(Prior Art)

(Prior Art)

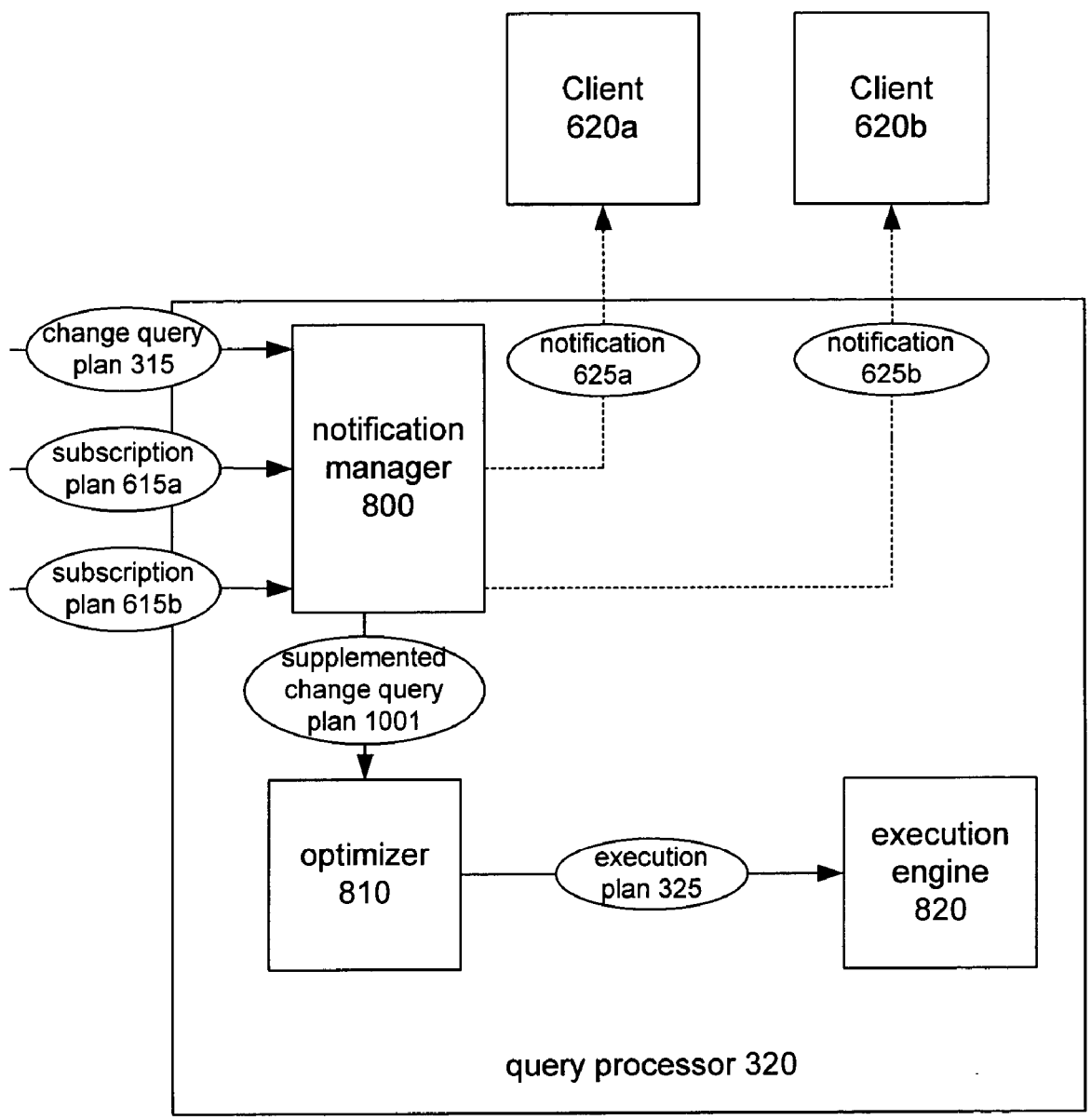

SYSTEM AND METHOD FOR DATABASE CHANGE NOTIFICATION

BACKGROUND OF THE INVENTION

1. Field of the Invention

The present invention relates to the field of database applications and, more specifically, to synchronizing data stored at a back end database and a front end client application.

2. Description of the Prior Art

In conventional database applications such as, for example, web services or business intelligence systems, one or more front end client applications typically function in connection with a back end database. The database generally enables entry, storage, retrieval, and manipulation of underlying data, while clients generally perform operations such as, for example, implementing business logic or caching data. The data stored at the database is constantly being changed, and, therefore, it is desirable for each client to determine when such changes are made so that they will not perform operations on out of date data, especially in the circumstance where the client caches data from the database and performs operations on the cached data.

There is no effective guideline for determining when such changes will occur. Rates of change of data generally vary at different times of day and often do not remain constant over long periods of time. Furthermore, rates of change of data corresponding to different entities are also likely to vary, and each client may perform operations on a wide range of data entities.

The clients typically determine if data in the database has been updated by periodically re-querying the database. However, because the clients cannot anticipate when updates will occur, such re-querying is often performed either too frequently or not frequently enough. If re-querying is performed too frequently, then an unnecessary expense is incurred, while, if re-querying is not performed frequently enough, then the client will perform operations on out of date data in the cache.

Thus, there is a need in the art for systems and methods for effectively notifying clients of changes to underlying data in a a database so that clients can update their caches with the changed data. It is desired that a client receive notification only when data relevant to operations performed at the particular client is changed.

SUMMARY OF THE INVENTION

Accordingly, systems and methods for database change notification are disclosed. A client submits a subscription to a database. The subscription selects a first subset of data from within a set of data. A subscription plan is generated based on the subscription. The subscription plan filters the first subset of data from within the set of data. The subscription plan may be stored at a notification manager.

A query is received at the database. The query changes a second subset of data within the set of data. A query plan is generated based on the query. The query plan filters the second subset of data from within the set of data.

The subscription is matched to the query based on the data set, and the query plan is supplemented with the subscription plan. The supplemented query plan is executed whereby the query changes the second subset of data and the subscription filters the first subset of data from within the second subset of data to form a third subset of data. It is determined whether the third subset of data is non-empty, and, if the third subset of data is non-empty, then a notification of the change to the third subset of data is generated. The notification may be sent to the client.

Additional features and advantages of the invention will be made apparent from the following detailed description of illustrative embodiments that proceeds with reference to the accompanying drawings.

BRIEF DESCRIPTION OF THE DRAWINGS

The illustrative embodiments will be better understood after reading the following detailed description with reference to the appended drawings, in which:

FIG. 8 is a block diagram of the query processor of FIG. 7 in accordance with the present invention;

DETAILED DESCRIPTION

Figure 1:
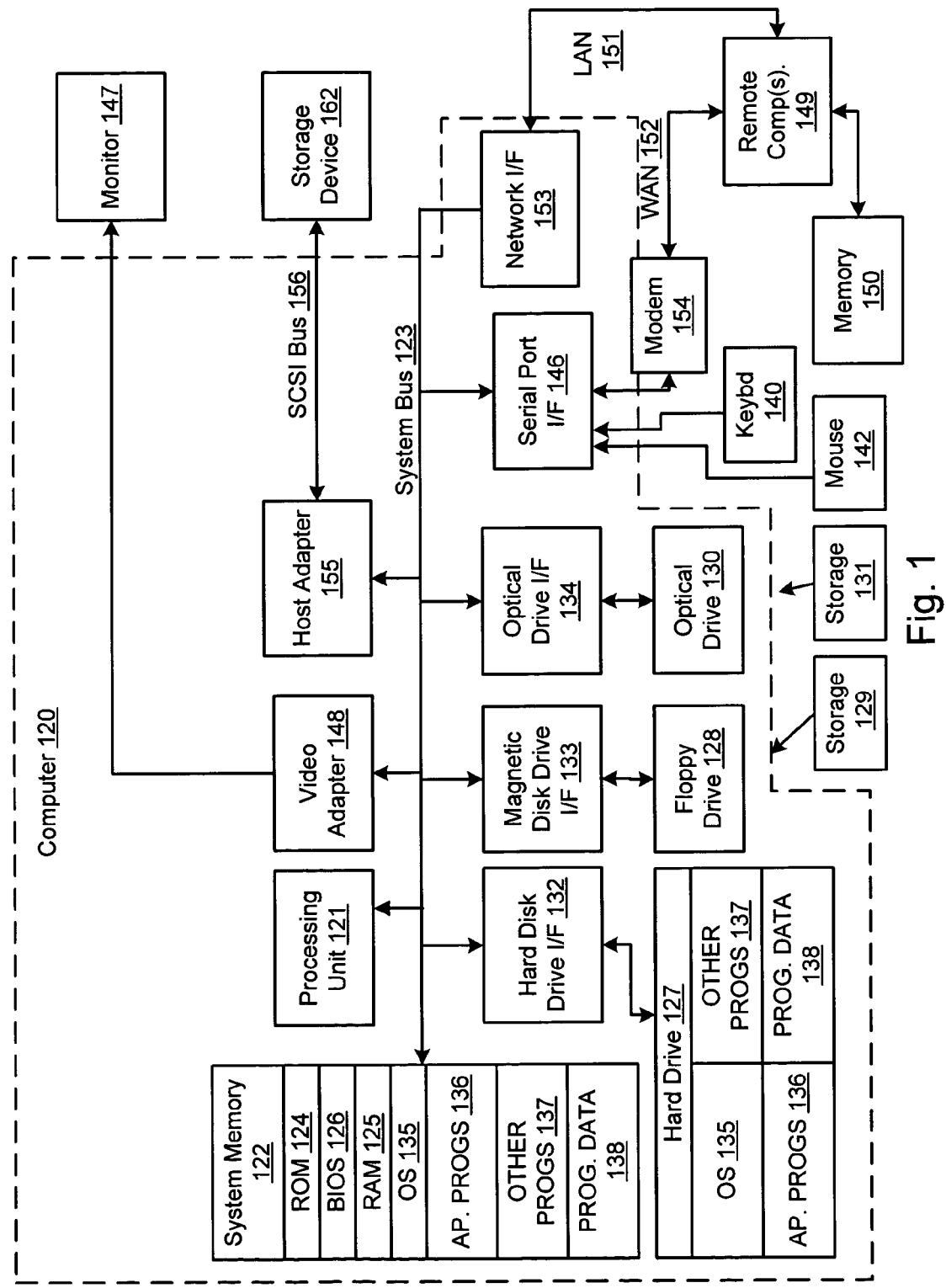
FIG. 1 is a block diagram representing a general purpose computer system in which aspects of the present invention and/or portions thereof may be incorporated.

Systems and methods that meet the above-mentioned objects and provide other beneficial features in accordance with the presently preferred exemplary embodiments of the invention will be described below with reference to aforementioned Figures. Those skilled in the art will readily appreciate that the description given herein with respect to those figures is for explanatory purposes only and is not intended in any way to limit the scope of the invention. Throughout the description, like reference numerals will refer to like elements in the respective figures.

Computer Environment

FIG. 1 and the following discussion are intended to provide a brief general description of a suitable computing environment in which the present invention and/or portions thereof may be implemented. Although not required, the invention is described in the general context of computer-executable instructions, such as program modules, being executed by a computer, such as a client workstation or a server. Generally, program modules include routines, programs, objects, components, data structures and the like that perform particular tasks or implement particular abstract data types. Moreover, it should be appreciated that the invention and/or portions thereof may be practiced with other computer system configurations, including hand-held devices, multi-processor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

As shown in FIG. 1, an exemplary general purpose computing system includes a conventional personal computer 120 or the like, including a processing unit 121, a system memory 122, and a system bus 123 that couples various system components including the system memory to the processing unit 121. The system bus 123 may be any of several types of bus structures including a memory bus or memory controller, a peripheral bus, and a local bus using any of a variety of bus architectures. The system memory includes read-only memory (ROM) 124 and random access memory (RAM) 125. A basic input/output system 126 (BIOS), containing the basic routines that help to transfer information between elements within the personal computer 120, such as during start-up, is stored in ROM 124.

The personal computer 120 may further include a hard disk drive 127 for reading from and writing to a hard disk (not shown), a magnetic disk drive 128 for reading from or writing to a removable magnetic disk 129, and an optical disk drive 130 for reading from or writing to a removable optical disk 131 such as a CD-ROM or other optical media. The hard disk drive 127, magnetic disk drive 128, and optical disk drive 130 are connected to the system bus 123 by a hard disk drive interface 132, a magnetic disk drive interface 133, and an optical drive interface 134, respectively. The drives and their associated computer-readable media provide non-volatile storage of computer readable instructions, data structures, program modules and other data for the personal computer 120.

Although the exemplary environment described herein employs a hard disk, a removable magnetic disk 129, and a removable optical disk 131, it should be appreciated that other types of computer readable media which can store data that is accessible by a computer may also be used in the exemplary operating environment. Such other types of media include a magnetic cassette, a flash memory card, a digital video disk, a Bernoulli cartridge, a random access memory (RAM), a read-only memory (ROM), and the like.

A number of program modules may be stored on the hard disk, magnetic disk 129, optical disk 131, ROM 124 or RAM 125, including an operating system 135, one or more application 212 programs 136, other program modules 137 and program data 138. A user may enter commands and information into the personal computer 120 through input devices such as a keyboard 140 and pointing device 142 such as a mouse. Other input devices (not shown) may include a microphone, joystick, game pad, satellite disk, scanner, or the like. These and other input devices are often connected to the processing unit 121 through a serial port interface 146 that is coupled to the system bus, but may be connected by other interfaces, such as a parallel port, game port, or universal serial bus (USB). A monitor 147 or other type of display device is also connected to the system bus 123 via an interface, such as a video adapter 148. In addition to the monitor 147, a personal computer typically includes other peripheral output devices (not shown), such as speakers and printers. The exemplary system of FIG. 1 also includes a host adapter 155, a Small Computer System Interface (SCSI) bus 156, and an external storage device 162 connected to the SCSI bus 156.

The personal computer 120 may operate in a networked environment using logical connections to one or more remote computers, such as a remote computer 149. The remote computer 149 may be another personal computer, a server, a router, a network PC, a peer device or other common network node, and typically includes many or all of the elements described above relative to the personal computer 120, although only a memory storage device 150 has been illustrated in FIG. 1. The logical connections depicted in FIG. 1 include a local area network (LAN) 151 and a wide area network (WAN) 152. Such networking environments are commonplace in offices, enterprise-wide computer networks, intranets, and the Internet.

When used in a LAN networking environment, the personal computer 120 is connected to the LAN 151 through a network interface or adapter 153. When used in a WAN networking environment, the personal computer 120 typically includes a modem 154 or other means for establishing communications over the wide area network 152, such as the Internet. The modem 154, which may be internal or external, is connected to the system bus 123 via the serial port interface 146. In a networked environment, program modules depicted relative to the personal computer 120, or portions thereof, may be stored in the remote memory storage device. It will be appreciated that the network connections shown are exemplary and other means of establishing a communications link between the computers may be used.

Database Application Environment

Figure 2:
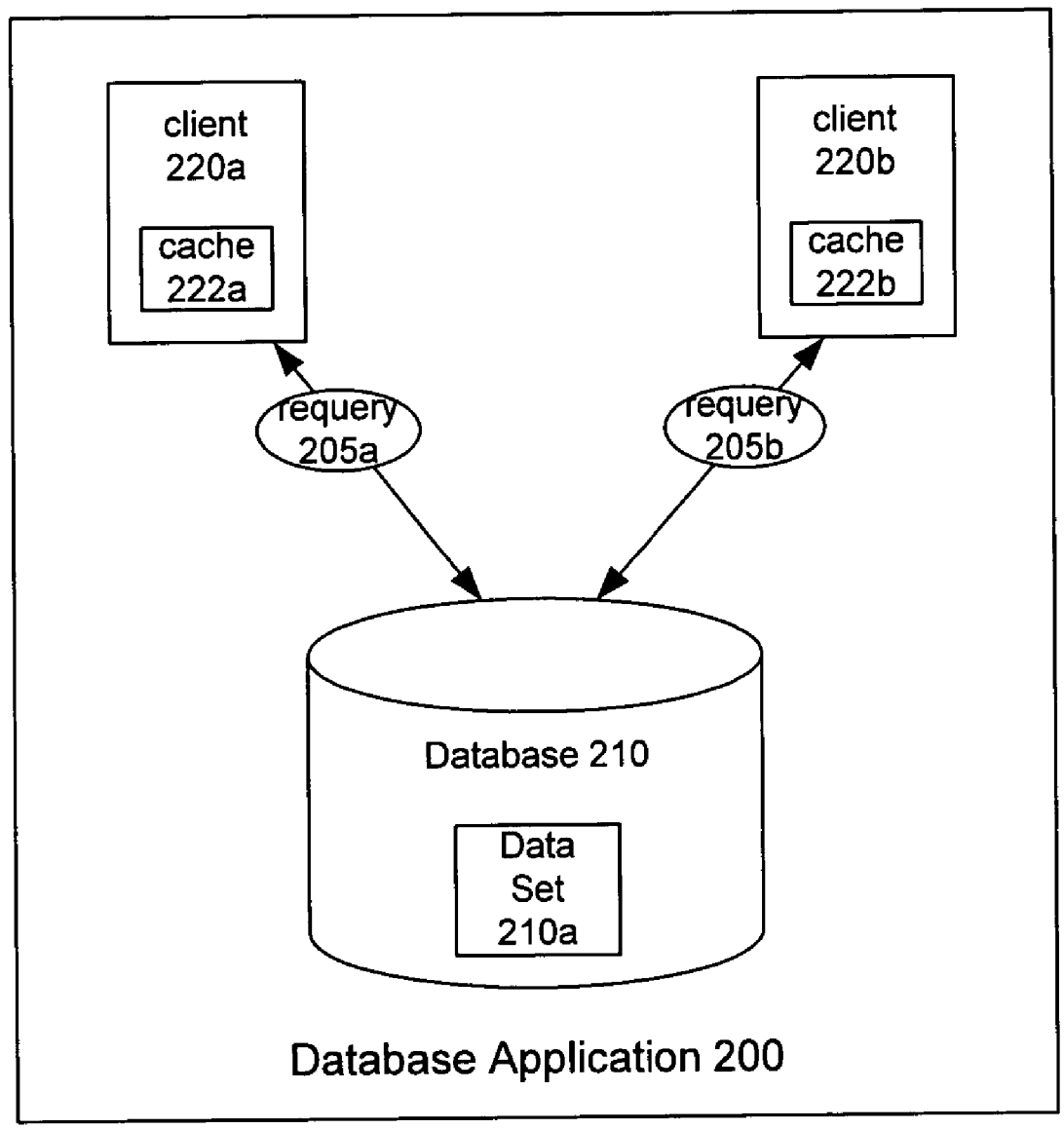
FIG. 2 is a block diagram of an exemplary prior art database application.

An exemplary prior art database application is shown in FIG. 2. As shown, database application 200 includes back end database 210 and one or more front end clients 220a and 220b. As should be appreciated, although two clients 220a and 220b are shown, any number of clients may function in connection with database 210. Database 210 generally enables entry, storage, retrieval, and manipulation of underlying data, while clients 220a and 220b generally perform operations such as, for example, implementing business logic or caching data.

Clients 220a and 220b each have a cache 222a and 222b, respectively. Clients 220a and 220b store data in caches 222a and 222b for local retrieval. Caches 222a and 22b are periodically updated with changes that occur at database 210. Clients 220a and 220b generally determine when to update caches 222a and 222b by submitting a requery 205a and 205b, respectively, to database 210.

Data stored at database 210 is typically organized in a data set 210a such as, for example, a data table. As should be appreciated, although only a single data set 210a is shown, database 210 may include any number of data sets. An exemplary data set 210a corresponding to "Employees" data is shown below in Table 1.

TABLE 1

| EMPLOYEES | |
|---|---|
| ID | NAME |
| 1 | John |
| 2 | Steve |

As shown in Table 1, each employee may be identified by an identifier ("ID") and a name.

Figure 3:
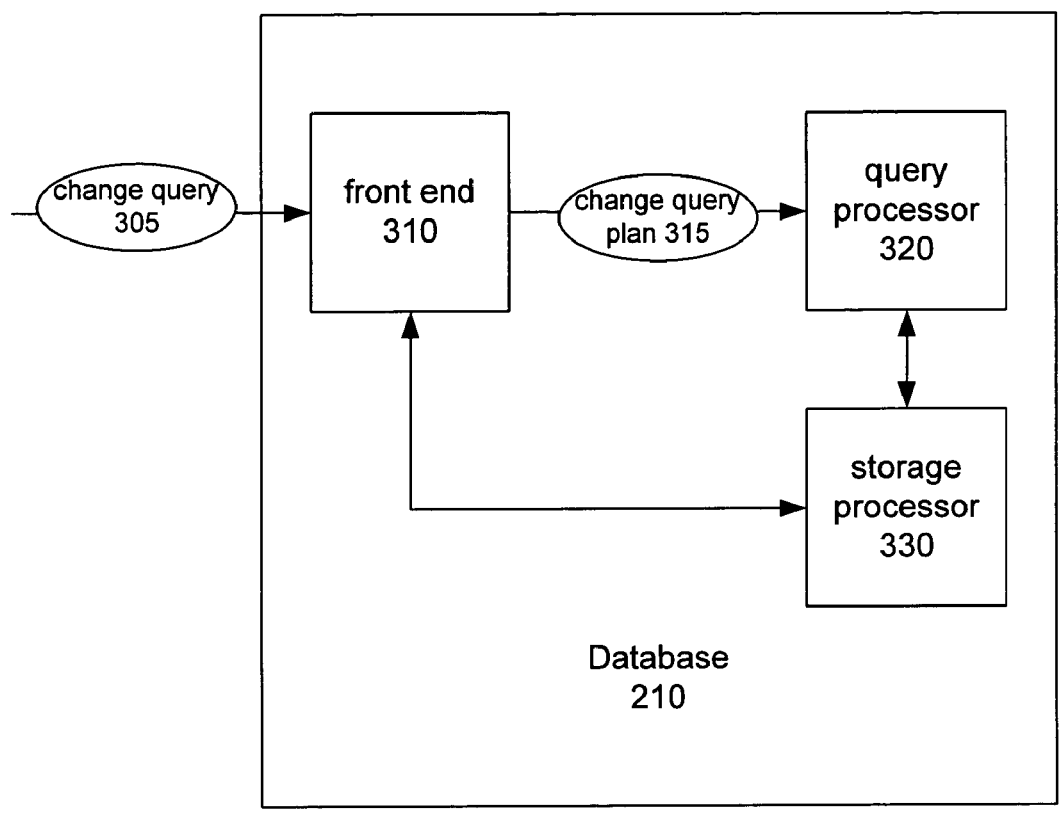
FIG. 3 is a block diagram of the prior art database of FIG. 2.

Data stored at data set 210a may be changed by a client 220a or 220b or by another entity by executing a change query at database 210. Database 210 includes components for processing such a change query. Referring now to FIG. 3, database 210 of FIG. 2 includes database front end 310, query processor 320, and storage processor 330. Database front end 310 receives change query 305 from a client 220a or 220b or another entity and validates change query 305. For example, front end 310 may validate that the table referenced by change query 305 is a valid table. Front end 310 may also verify that change query 305 has been submitted by an authorized user. Front end 310 also generates a change query plan 315 for executing the change query 305. Change query plan 315 is discussed in detail below with reference to FIG. 5.

Query processor 320 will be discussed in detail below with reference to FIG. 4. Generally, query processor 320 receives change query plan 315 and generates an execution plan based on change query plan 315. Thus, query processor 320 executes change query 305 according to the execution plan.

Storage Processor 330 maintains data in a storage medium. Storage processor 330 also maintains a database schema, which is a hierarchical organization of the data. Essentially, then, storage processor 330 contains the functionality to access the data of database 210 based on a received execution plan form query processor 320.

Figure 4:
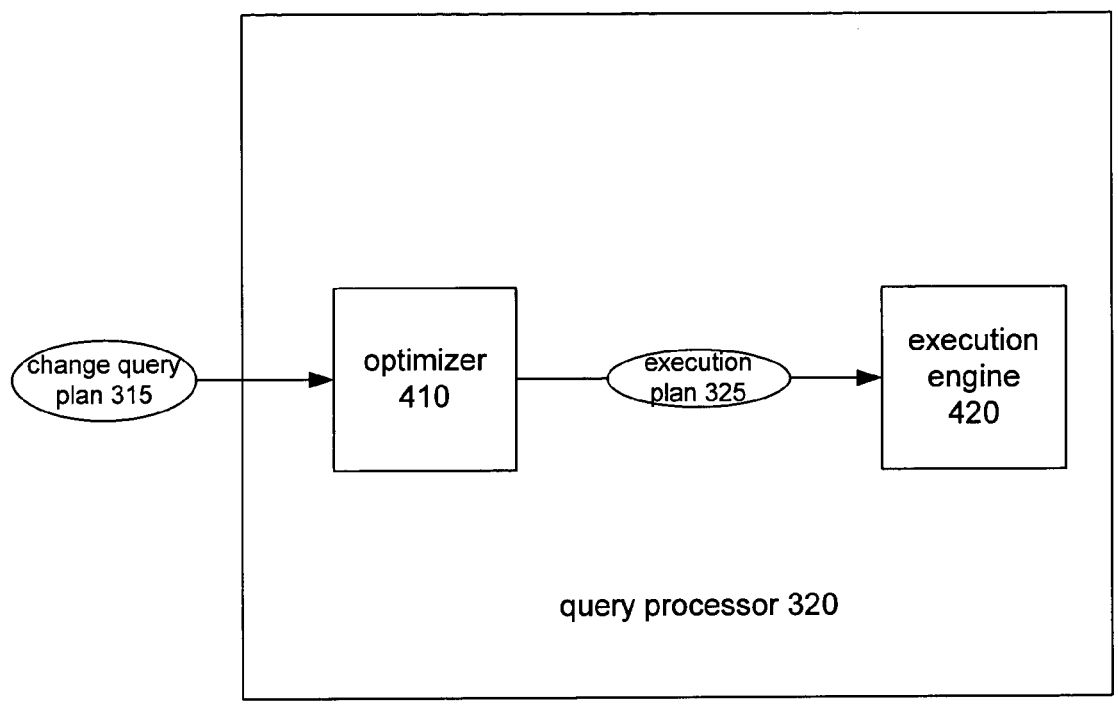
FIG. 4 is a block diagram of the prior art query processor of FIG. 3.

Referring now to FIG. 4, query processor 320 of FIG. 3 includes an optimizer 410 and an execution engine 420. Generally, optimizer 410 generates an execution plan 325 based on change query plan 315, and execution engine 420 executes change query 305 according to execution plan 325. Optimizer 410 may generate multiple candidate execution plans and perform a query optimization to select the candidate plan with the lowest estimated execution cost. Cost may be estimated based on factors such as, for example, the estimated cardinality of each candidate execution plan.

Change query 305, as submitted to database 210 by a client 220a or 220b or another entity may insert, delete, or modify data. Change query 305 may only change data in a single data table, at least for the purposes of the present application, which will be discussed in detail below. An exemplary change query 305 corresponding to the exemplary "Employee" Table 1 is shown below:

| Exemplary Change Query 305 | |
|---|---|
| UPDATE | Employees |
| SET NAME | Rick |
| WHERE | ID = 1 |

As shown, the "UPDATE" instruction specifies that the "Employees" table is to be changed. The "SET NAME" instruction specifies that selected data in the "Employees" table is to be changed to "Rick". The "WHERE" instruction specifies that the selected data to be changed is data in the "Employees" table with "ID" equal to "1". An exemplary "Employees" table after execution of exemplary change query 305 is shown below in Table 2:

TABLE 2

| EMPLOYEES | |
|---|---|
| ID | NAME |
| 1 | Rick |
| 2 | Steve |

As shown in Table 2, the name of Employee "1" has been changed to "Rick".

Figure 5:
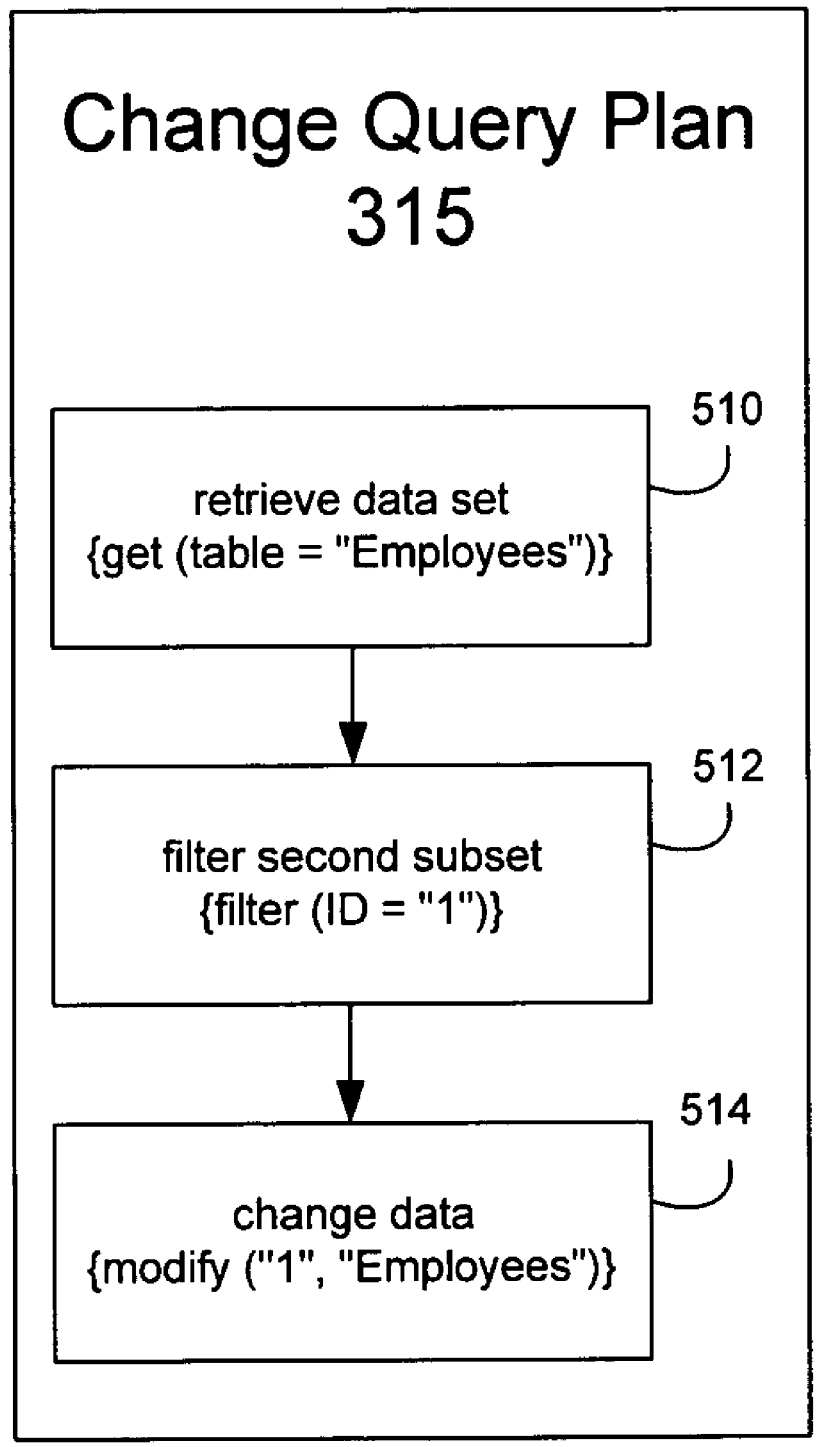
FIG. 5 is a block diagram of an exemplary prior art change query plan.

An exemplary change query plan 315, which corresponds to the exemplary change query plan 305 set forth above, is show in FIG. 5. As shown, at step 510, a set of data is retrieved. For example, for the exemplary query shown above, the "Employees" table is retrieved. At step 512, a "second" subset of data is filtered from the set. For reasons which will be set forth below with reference to FIGS. 9–11, the subset of data filtered at step 512 is referred to as the "second" subset of data. A "first" subset of data is filtered from the set of data in a previous processing step discussed in detail with reference to FIGS. 9–11. Step 512 may, for example, for exemplary change query 305, include the filtering of all rows in the "Employee" table in which "ID" is equal to "1". At step 514, the change is performed on the subset. For example, for exemplary change query 305, "Name" is changed to "Rick" for all rows in which "ID" is equal to "1".

Exemplary Systems and Methods of the Present Invention

Figure 6:
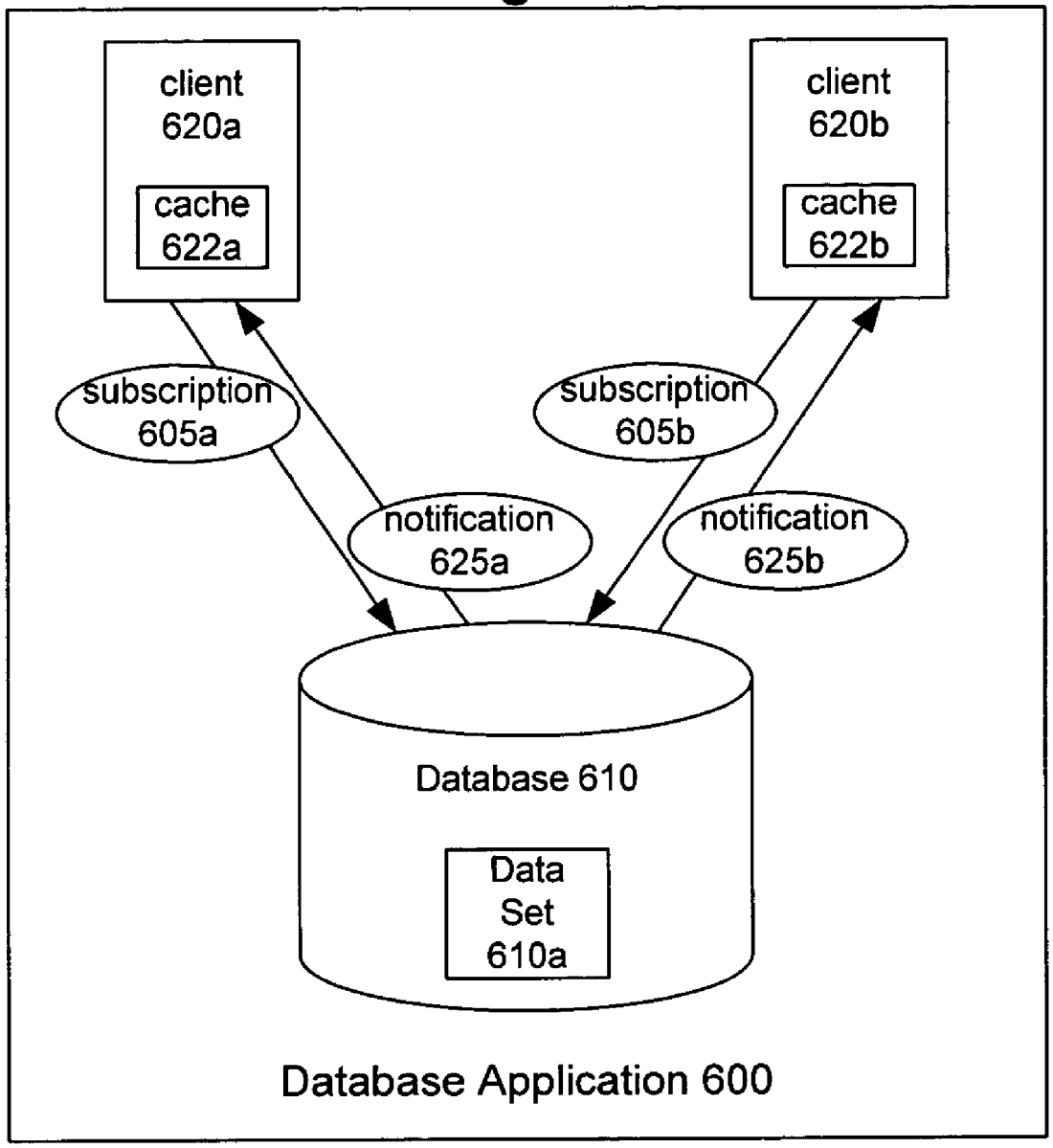
FIG. 6 is a block diagram of an exemplary database application in accordance with the present invention.

An exemplary database application in accordance with the present invention is shown in FIG. 6. As shown, database application 600 includes back end database 610 and one or more clients 620a and 620b. Generally, clients 620a and 620b submit subscriptions 605a and 605b, respectively, to database 610. Subscriptions 605a and 605b are queries that request data from database 610 to be stored at caches 622a and 622b. Importantly, and in one embodiment of the present invention, subscriptions 605a and 605b may also include a request to receive change notifications 625a and 625b, respectively, when the requested data changes at database 610.

As should be appreciated, although two clients 620a and 620b are shown, any number of clients 620 may function in connection with database 610 without departing from the spirit and scope of the present invention. Furthermore, although only a single subscription 605a and 605b and notification 625a and 625b, are shown for each client 620a and 620b, respectively, each client 620a and 620b may submit any number of subscriptions 605 and receive any number of notifications 625.

Exemplary subscriptions 605a and 605b corresponding to exemplary "Employees" Table 1 are shown below:

| Exemplary Subscription 605a | |
|---|---|
| SELECT | * |
| FROM | Employee |
| WHERE | Name = John |
| Exemplary Subscription 605b | |
| SELECT | * |
| FROM | Employee |
| WHERE | Name = Steve |

As shown, the "SELECT" instruction specifies which data is to be selected. The "*" operator represents all data. The "FROM" instruction specifies the data set from which data is to be selected. The "WHERE" instruction specifies a condition for a first subset of the data set to be filtered. Thus, exemplary subscription 605a selects all data in the "Employees" table (Table 1) with "name" equal to "John", while exemplary subscription 605b selects all data in the "Employees" table (table 1) with "name" equal to "Steve".

Figure 7:
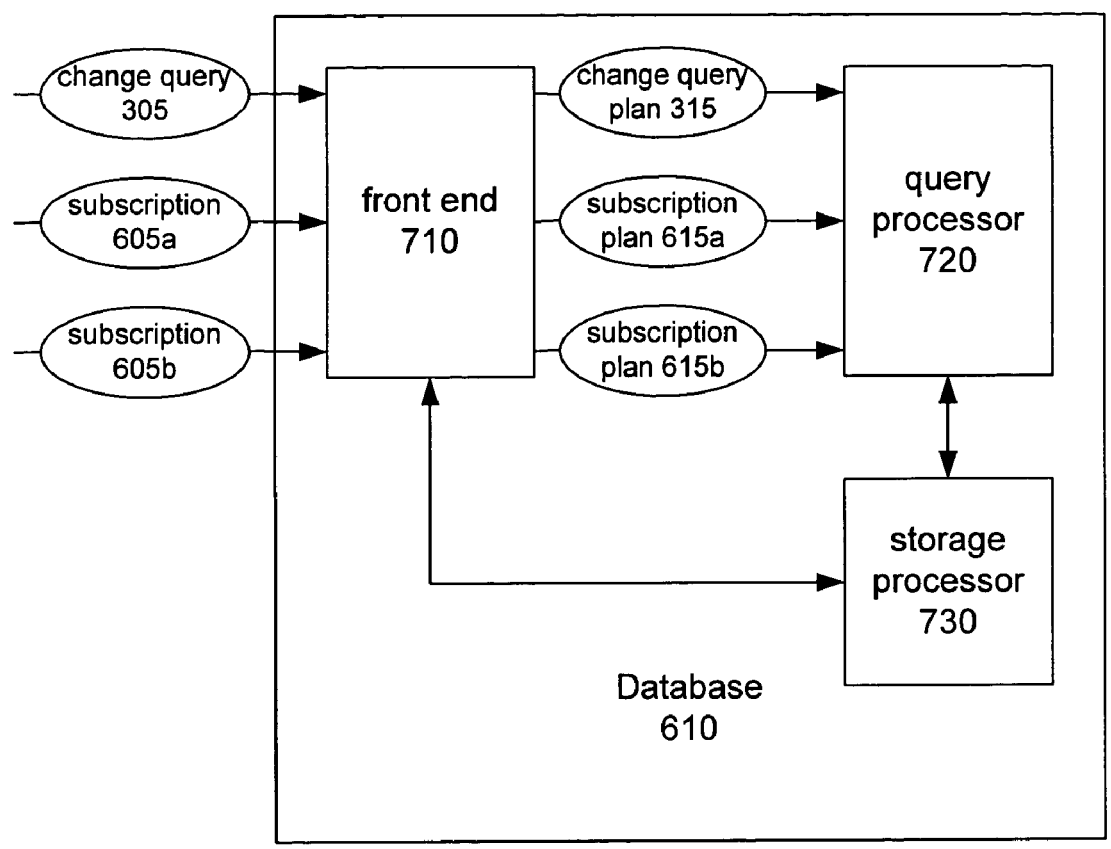
FIG. 7 is a block diagram of the database of FIG. 6 in accordance with the present invention.

An exemplary database 610 in accordance with the present invention is shown in FIG. 7. As shown, in addition to receiving and validating change query 305 and generating change query plan 315, front end 710 receives and validates subscriptions 605a and 605b. For example, front end 310 may validate that the tables referenced by subscriptions 605a and 605b are a valid tables. Front end 310 may also verify that subscriptions 605a and 605b have been submitted by authorized clients 620a and 620b. Furthermore, in addition to generating change query plan 315 for change query 305, front end 710 generates subscription plans 615a and 615b for subscriptions 650a and 605b, respectively. Subscription plans 615a and 615b are discussed in detail below with reference to FIG. 9.

An exemplary query processor 720 in accordance with the present invention is shown in FIG. 8. As shown, unlike conventional query processor 320 of FIG. 4, query processor 720 of FIG. 8 includes notification manager 800. Generally, notification manager 800 receives subscription plans 615a and 615b and change query plan 315. If change query plan 315 changes data selected by subscription plans 615a and 615b, then notification manager 800 notifies clients 620a and 620b of such a change by submitting notifications 625a and 625b, respectively. In one embodiment of the present invention, if notification 625 is sent, then the corresponding subscription 605 is terminated, and client 620 may re-subscribe to the selected data. In another embodiment of the present invention, subscription 605 persists even after the notification 625 is sent, and client 620 may be notified of further changes to data selected by subscription 605. Such an embodiment in which the subscription 605 persists after notification 625 is sent is desirable when client 620 is, for example, an electronic mail client that will be notified each time an electronic mail is received.

Although exemplary query processor 720 is described below with reference to submitting notification 625 as a result of a change to data in accordance with change query 305, it should be appreciated that query processor 720 is not limited to submitting notification 625 as a result of a data change. Submitting notification 625 as a result of other actions is contemplated in accordance with the present invention. For example, if the employees table is removed or deleted from database 210, then notification 625 may be submitted in accordance with the present invention.

Notification manager 800 preferably receives and stores subscription plans 615a and 615b. Furthermore, notification manager 800 preferably receives change query plan 315 and preferably matches subscription plans 615a and 615b to change query plan 315. Such matching is preferably performed based on the data set specified in each of change query 305 and subscriptions 605a and 605b. Specifically, exemplary change query 305 changes data from exemplary "Employees" Table 1, and exemplary subscriptions 605a and 605b select data from exemplary "Employees" Table 1. As should be appreciated, every subscription stored at notification manager 800 need not necessarily match a particular change query 305.

After matching subscriptions 605a and 605b to change query 305, notification manager 800 supplements change query plan 315 with subscription plans 615a and 615b to generate notifications 625a and 625b, respectively, if needed to notify a client 620 of a change that could affect data cached by such a client. An exemplary method for generating notifications 625a and 625b is discussed in detail below with reference to FIG. 11.

Figure 9A:
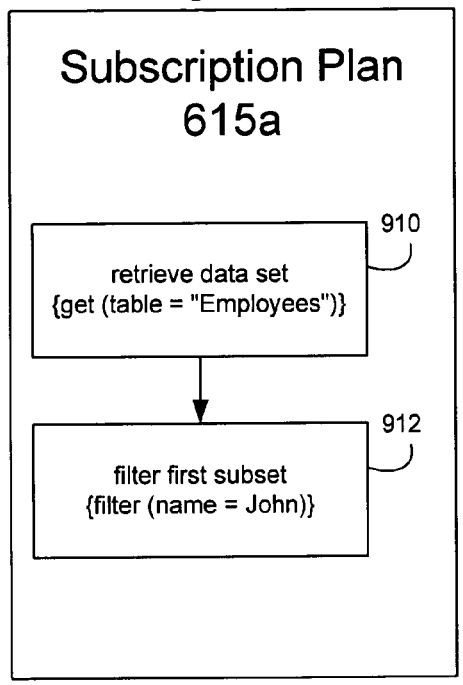
FIGS. 9a and 9b are block diagrams of exemplary subscription plans in accordance with the present invention.
Figure 9B:
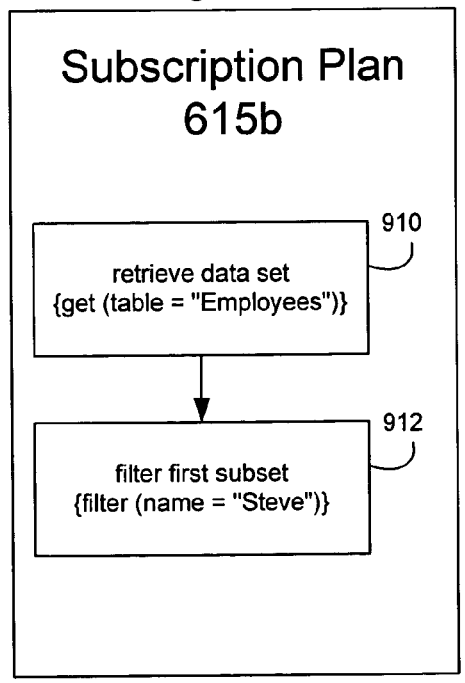

Exemplary subscription plans 615a and 615b in accordance with the present invention are shown in FIGS. 9a and 9b, respectively. As shown, at step 910, a set of data is retrieved. For exemplary subscriptions 605a and 605b, the "Employees" table is retrieved. At step 912, a first subset of data is filtered from the set. For example, for exemplary subscription 605a, all rows in the "Employees" table in which "Name" is equal to "John" are filtered. For exemplary subscription 605b, all rows in the "Employees" table in which "Name" is equal to "Steve" are filtered.

After matching subscriptions 605a and 605b to change query 305, and in one embodiment of the present invention, notification manager 810 supplements change query plan 315 with subscription plans 615a and 615b. Such supplementation of change query plan 315 occurs prior to the optimization of change query 305 performed at optimizer 810. Accordingly, the supplementation of change query plan 315 does not obstruct or interfere with the optimization process, and optimizer 810 generates a single execution plan 325

Figure 10:
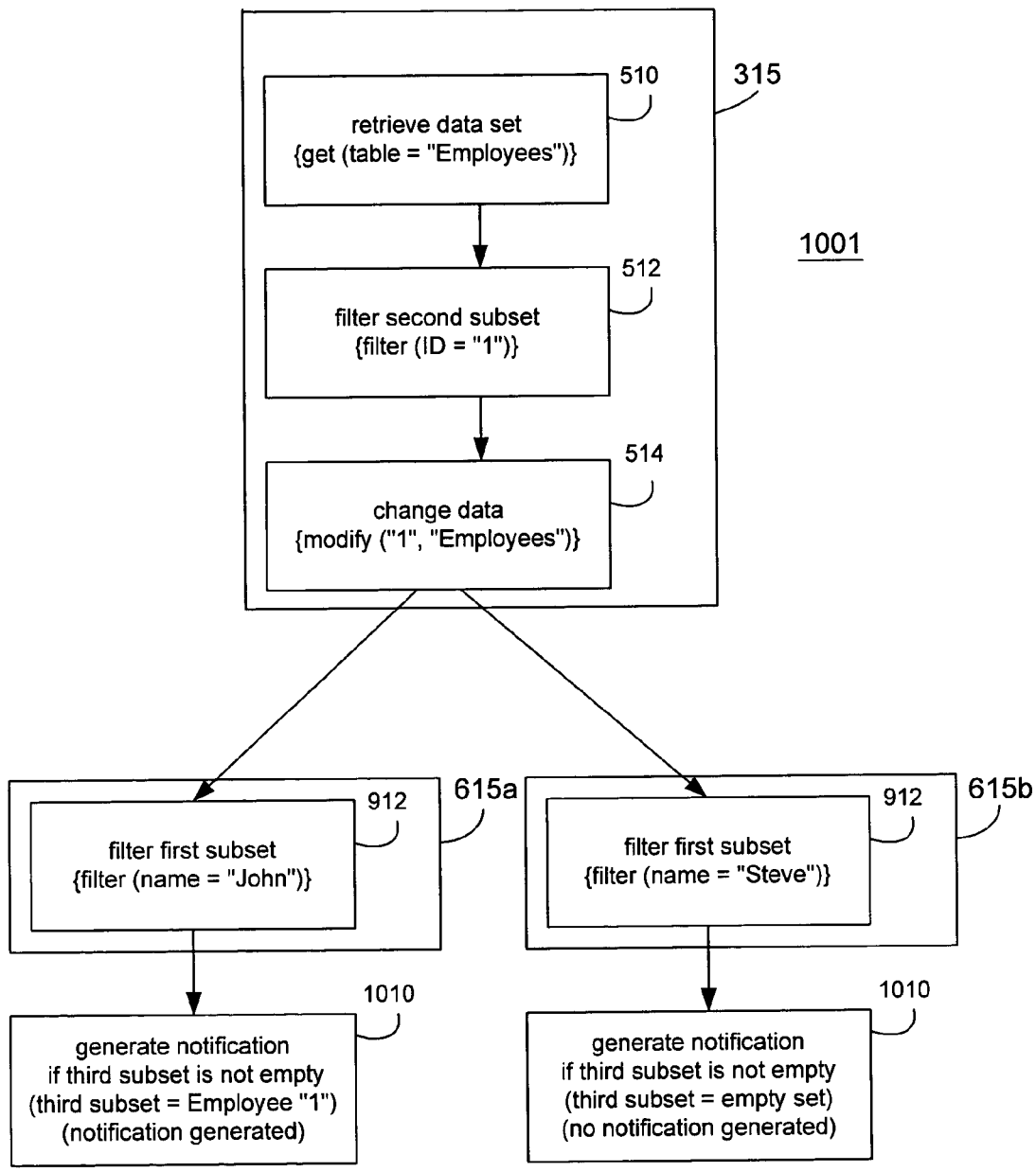
FIG. 10 is a block diagram of an exemplary supplemented change query plan in accordance with the present invention.

An exemplary supplemented change query plan 1001 in accordance with the present invention is shown in FIG. 10. As shown, change query plan 315 is supplemented with subscription plans 615a and 615b, and resulting notifications 625a and 625b are generated if changed data relevant to the subscription plan 615 is detected. As should be appreciated, although change query plan 315 has been supplemented with two subscriptions plans 615a and 615b, a change query plan 315 may be supplemented with any number of subscription plans 615 corresponding to any number of matching subscriptions 605. Detection of changes made as a result of change query 305 is fully integrated into change query plan 315, and such detection may be strictly coupled to the actual operations that perform the changes.

At step 510 of supplemented change query plan 1001, a set of data is retrieved. For example, for the exemplary change query 305 shown above, the "Employees" table is retrieved. At step 512, a second subset of data to be changed is filtered from the set. For example, for the exemplary query, all rows in the "Employees" table in which "ID" is equal to "1" are filtered from the table. At step 514, the change is performed on the subset. For example, for the exemplary query, at step 514, data in the "Name" column is set to "Rick" for all rows in which "ID" is equal to "1". Thus, and as before, the "Employees" table has been changed from a state as shown in Table 1 to a state as shown in Table 2.

At step 912, and corresponding to each subscription plan 615a and 615b, a first subset of data is filtered from the second subset of data to form a third subset of data. For example, for exemplary subscription plan 615a, all rows in which "Name" is equal to "John" are filtered from all rows in which "ID" is equal to "1". Thus, Employee "1" is filtered from the "Employee" table to form the third subset of data. For exemplary subscription plan 615b, all rows in which "Name" is equal to "Steve" are filtered from all rows in which "ID" is equal to "1". Thus, no rows remain in the third subset of data.

At step 1010, a notification is sent if the third subset of data is not empty. For example, notification 625a is generated and submitted to client 620a because the row with Employee "1" remains in the third subset of data, owing to the fact that data relevant to subscription plan 605a from client 620a has been modified. Notification 625a preferably specifies that the name of Employee "1" has been changed from "John" to "Rick". In contrast, notification 625b is not generated and submitted to client 620b because no row remains in the third subset, owing to the fact that no data relevant to subscription plan 605b from client 620b exists.

Figure 11:
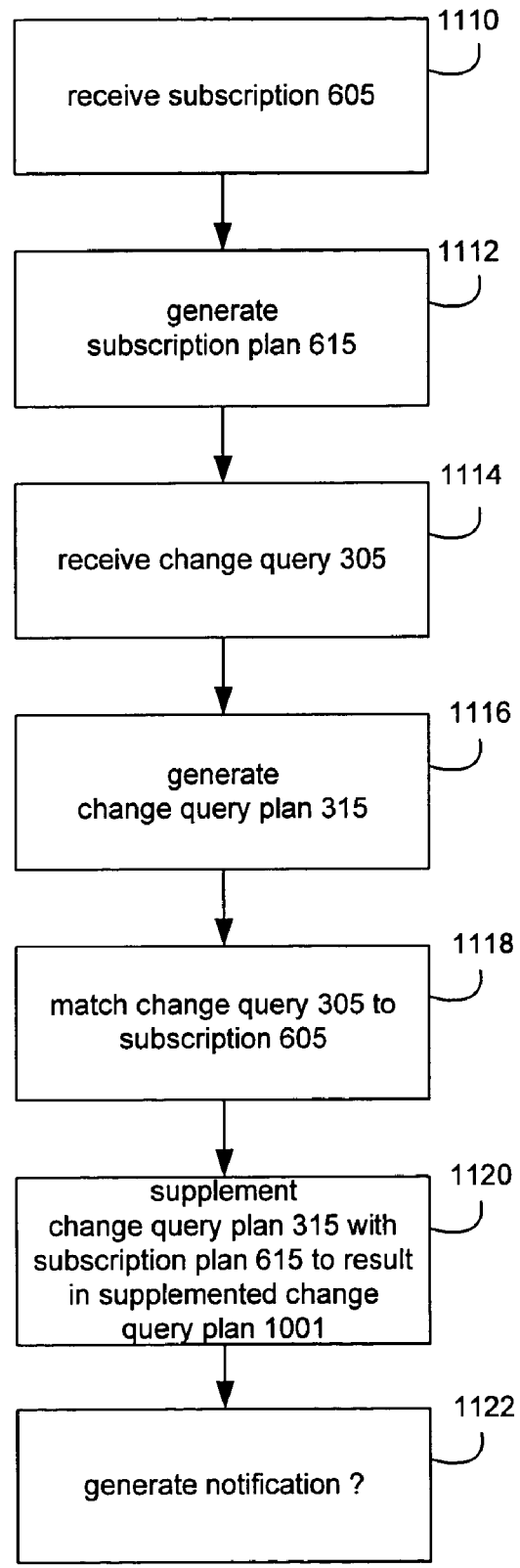
FIG. 11 is a flowchart of an exemplary method for database change notification in accordance with the present invention.

A flowchart of an exemplary method for database change notification in accordance with the present invention is shown in FIG. 11. As should be appreciated, although the exemplary method is discussed with reference to only a single subscription 605a and 605b from each of two clients 620a and 620b, respectively, the exemplary method may be used in connection with any number of subscriptions 605 from any number of clients 620.

As shown, at step 1110, front end 710 receives subscriptions 605a and 605b from clients 620a and 620, respectively. Subscriptions 605a and 605b include queries that specify data which clients 620a and 620b are requesting, presumably to be cached locally thereat, and also specify that each client 620 is to receive change notifications 625a and 625b, respectively, when the requested data changes at database 610. At step 1112, front end 710 generates subscription plans 615a and 615b for subscriptions 605a and 605b, respectively. Subscription plans 615a and 615b are preferably submitted to notification manager 800. Notification manager 800 preferably stores subscription plans 615a and 615b. Each subscription plan 615a and 615b may be tied to the requesting client 620 and may be deleted when the client 620 logs off or disconnects from database 210.

At step 1114, front end 710 receives change query 305 from a client 620 or another entity, and, at step 1116, front end 710 generates change query plan 315. Change query plan 315 is preferably submitted to notification manager 800.

At step 1118, notification manager 800 matches subscriptions 605a and 605b to change query 305. Such matching is preferably performed based on the data set specified in change query 305 matching the data set specified in subscriptions 605a and 605b. As should be appreciated, every subscription 605 stored at notification manager 800 need not necessarily match a particular change query 305.

At step 1120, notification manager 800 supplements change query plan 315 with subscription plans 615a and 615b to result in the supplemented change query plan 1001 of FIG. 10. At step 1122, notification manager 800 generates notifications 625a and 625b if necessary and submits such notifications to clients 620a and 620b, respectively.

While the present invention has been described in connection with the preferred embodiments of the various figures, it is to be understood that other similar embodiments may be used or modifications and additions may be made to the described embodiment for performing the same function of the present invention without deviating therefrom. Therefore, the present invention should not be limited to any single embodiment, but rather should be construed in breadth and scope in accordance with the appended claims.

We claim:

1. A method for notifying a client of a change to data stored at a database, the method comprising:
    receiving a subscription from the client, the subscription selecting a first subset of data from within a set of data;
    generating a subscription plan for filtering the first subset from within the set of data;
    receiving a query to be executed at the database, the query changing a second subset of data within the set of data;
    generating a query plan for executing the query, the query plan for filtering the second subset from within the set of data;
    matching the subscription to the query based on the set of data;
    supplementing the query plan with the subscription plan;
    prior to executing the supplemented query plan, evaluating the supplemented query plan whereby the subscription filters the first subset of data from within the second subset of data to form a third subset of data;
    determining based on the third set of data whether or not to generate a notification of the change to the third subset of data such that the notification is generated when the third subset of data is non-empty, and the notification is not generated when the third set of data is empty; and
    after evaluating the supplemented query plan, executing the query by changing the second subset of data.

2. The method of claim 1, further comprising terminating the subscription.

3. The method of claim 1, further comprising persisting the subscription.

4. The method of claim 1, further comprising storing the subscription plan at a notification manager.

5. The method of claim 1, further comprising submitting the notification to the client.

6. The method of claim 5, further comprising changing the third subset of data at the client.

7. A computer readable medium having stored thereon computer readable instructions for performing the following steps:
    receiving a subscription from a client, the subscription selecting a first subset of data from within a set of data stored at a database;
    generating a subscription plan for filtering the first subset from within the set of data;
    receiving a query to be executed at the database, the query changing a second subset of data within the set of data;
    generating a query plan for executing the query, the query plan for filtering the second subset from within the set of data;
    matching the subscription to the query based on the set of data;
    supplementing the query plan with the subscription plan;
    prior to executing the supplemented query plan, evaluating the supplemented query plan whereby the subscription filters the first subset of data from within the second subset of data to form a third subset of data;
    determining based on the third set of data whether or not to generate a notification of the change to the third subset of data such that the notification is generated when the third subset of data is non-empty, and the notification is not generated when the third set of data is empty; and
    after evaluating the supplemented query plan, executing the query by changing the second subset of data.

8. The computer readable medium of claim 7, further comprising computer readable instructions for terminating the subscription.

9. The computer readable medium of claim 7, further comprising computer readable instructions for persisting the subscription.

10. The computer readable medium of claim 7, further comprising computer readable instructions for storing the subscription plan at a notification manager.

11. The computer readable medium of claim 7, further comprising computer readable instructions for submitting the notification to the client.

12. The computer readable medium of claim 11, further comprising computer readable instructions for changing the third subset of data data at the client.

13. A system for notifying a client of a change to data stored at a database, the system comprising:
    the client comprising a cached version of data stored at the database;
    the database for storing the data, the database comprising:
        a database front end for:

receiving a subscription from the client, the subscription selecting a first subset of data from within a set of data;

generating a subscription plan for filtering the first subset from within the set of data;

receiving a query to be executed at the database, the query changing a second subset of data within the set of data; and generating a query plan for executing the query, the query plan for filtering the second subset from within the set of data; and a notification manager for:

matching the subscription to the query based on the set of data;

supplementing the query plan with the subscription plan;

prior to executing the supplemented query plan, evaluating the supplemented query plan whereby the subscription filters the first subset of data from within the second subset of data to form a third subset of data;

determining based on the third set of data whether or not to generate a notification of the change to the third subset of data such that the notification is generated when the third subset of data is non-empty, and the notification is not generated when the third set of data is empty;

an execution engine for executing the query by changing the second subset of data only after the supplemented query plan is evaluated.

14. The system of claim 13, wherein the subscription is terminated after the notification is generated.

15. The system of claim 13, wherein the subscription is persisted after the notification is generated.

16. The system of claim 13, wherein the notification manager is further for storing the subscription plan.

17. The system of claim 13, wherein the database further comprises:

an optimizer for generating an execution plan for the query based on the query plan;

and a storage processor for maintaining data in a storage medium.

18. The system of claim 13, wherein the notification manager is further for submitting the notification to the client.

* * * * *